(12) United States Patent
XiaoPing

(10) Patent No.: US 10,209,833 B1
(45) Date of Patent: Feb. 19, 2019

(54) APPARATUS AND METHODS FOR DETECTING A CONDUCTIVE OBJECT AT A LOCATION

(71) Applicant: Creator Technology B.V., Tilburg (NL)

(72) Inventor: Jiang XiaoPing, Shanghai (CN)

(73) Assignee: Creator Technology B.V., Tilburg (NL)

( * ) Notice: Subject to any disclaimer, the term of this patent is extended or adjusted under 35 U.S.C. 154(b) by 0 days.

(21) Appl. No.: 13/975,078

(22) Filed: Aug. 23, 2013

Related U.S. Application Data

(63) Continuation of application No. 13/442,716, filed on Apr. 9, 2012, now Pat. No. 8,519,973, which is a continuation of application No. 13/204,543, filed on Aug. 5, 2011, now Pat. No. 8,174,507, which is a continuation of application No. 11/437,517, filed on May 18, 2006, now Pat. No. 8,004,497.

(51) Int. Cl.
*G06F 3/033* (2013.01)
*G06F 3/044* (2006.01)

(52) U.S. Cl.
CPC .................................. *G06F 3/044* (2013.01)

(58) Field of Classification Search
CPC ....................................................... G06F 3/044
USPC .................................................. 345/156–179
See application file for complete search history.

(56) References Cited

U.S. PATENT DOCUMENTS

| | | | |
|---|---|---|---|
| 3,886,539 A * | 5/1975 | Gould, Jr. ................ | 345/173 |
| 3,979,745 A | 9/1976 | Bishop | |
| 4,039,940 A | 8/1977 | Butler et al. | |
| 4,113,378 A | 9/1978 | Wirtz | |
| 4,145,748 A | 3/1979 | Eichelberger et al. | |
| 4,193,063 A | 3/1980 | Hitt et al. | |
| 4,238,711 A | 12/1980 | Wallot | |
| 4,264,903 A | 4/1981 | Bigelow | |
| 4,266,144 A | 5/1981 | Bristol | |
| 4,290,061 A * | 9/1981 | Serrano ............. | H03K 17/9622 341/33 |

(Continued)

FOREIGN PATENT DOCUMENTS

| EP | 0574213 A | 12/1993 |
|---|---|---|
| GB | 05000604 B2 | 2/2005 |

OTHER PUBLICATIONS

"Photolithography," Wikipedia, the free encyclopedia, downloaded Apr. 20, 2006, http://en.wikipedia.org/wiki/Photolithography; 3 pages.

(Continued)

*Primary Examiner* — Benyam Ketema
(74) *Attorney, Agent, or Firm* — JCIPRNET

(57) ABSTRACT

A method and apparatus to determine capacitance variations of a first number of two or more sense elements of a touch screen device. A processing device is configured to detect a presence of a conductive object on any one of a second number of three or more button areas of the touch screen device. The first number of sense elements is less than the second number of button areas. The processing device is further configured to recognize an activation of one of the three or more button areas using the determined capacitance variations of the first number of two or more sense elements.

20 Claims, 10 Drawing Sheets

(56) References Cited

U.S. PATENT DOCUMENTS

| | | | |
|---|---|---|---|
| 4,292,604 A | 9/1981 | Embree et al. | |
| 4,305,135 A | 12/1981 | Dahl et al. | |
| 4,586,260 A | 5/1986 | Baxter et al. | |
| 4,614,937 A | 9/1986 | Poujois | |
| 4,728,932 A | 3/1988 | Atherton | |
| 4,736,191 A | 4/1988 | Matzke et al. | |
| 4,825,147 A | 4/1989 | Cook et al. | |
| 4,831,325 A | 5/1989 | Watson, Jr. | |
| 5,008,497 A | 4/1991 | Asher | |
| 5,214,388 A | 5/1993 | Vranish et al. | |
| 5,237,879 A | 8/1993 | Speeter | |
| 5,305,017 A | 4/1994 | Gerpheide | |
| 5,323,158 A | 6/1994 | Ferguson, Jr. | |
| 5,373,245 A | 12/1994 | Vranish et al. | |
| 5,386,219 A | 1/1995 | Greanias et al. | |
| 5,463,388 A * | 10/1995 | Boie | G06F 3/044 |
| | | | 341/33 |
| 5,518,078 A | 5/1996 | Tsujioka et al. | |
| 5,541,580 A | 7/1996 | Gerston et al. | |
| 5,670,915 A | 9/1997 | Cooper et al. | |
| 5,760,852 A | 6/1998 | Wu et al. | |
| 5,801,340 A | 9/1998 | Peter | |
| 5,920,309 A | 7/1999 | Bisset et al. | |
| 5,942,733 A | 8/1999 | Allen et al. | |
| 6,037,929 A | 3/2000 | Ogura et al. | |
| 6,060,957 A | 5/2000 | Kodrnja et al. | |
| 6,145,850 A | 11/2000 | Rehm | |
| 6,184,871 B1 | 2/2001 | Teres et al. | |
| 6,188,391 B1 | 2/2001 | Seely et al. | |
| 6,191,723 B1 | 2/2001 | Lewis | |
| 6,297,811 B1 | 10/2001 | Kent et al. | |
| 6,353,200 B2 | 3/2002 | Schwankhart | |
| 6,366,099 B1 | 4/2002 | Reddi | |
| 6,377,129 B1 | 4/2002 | Rhee et al. | |
| 6,380,931 B1 | 4/2002 | Gillespie et al. | |
| 6,448,911 B1 | 9/2002 | Somayajula | |
| 6,490,203 B1 | 12/2002 | Tang | |
| 6,535,200 B2 | 3/2003 | Philipp | |
| 6,577,140 B1 | 6/2003 | Wenman | |
| 6,583,632 B2 | 6/2003 | Von Basse et al. | |
| 6,700,392 B2 * | 3/2004 | Haase | 324/674 |
| 6,781,577 B2 | 8/2004 | Shigetaka | |
| 6,806,693 B1 | 10/2004 | Bron | |
| 6,825,673 B1 | 11/2004 | Yamaoka | |
| 6,838,887 B2 | 1/2005 | Denen et al. | |
| 6,859,159 B2 | 2/2005 | Michalski | |
| 6,879,930 B2 | 4/2005 | Sinclair et al. | |
| 6,882,338 B2 | 4/2005 | Flowers | |
| 6,888,536 B2 | 5/2005 | Westerman et al. | |
| 6,891,531 B2 | 5/2005 | Lin | |
| 6,914,547 B1 | 7/2005 | Swaroop et al. | |
| 6,933,873 B1 | 8/2005 | Horsley et al. | |
| 6,940,291 B1 | 9/2005 | Ozick | |
| 6,946,853 B2 | 9/2005 | Gifford et al. | |
| 6,958,594 B2 | 10/2005 | Redl et al. | |
| 6,970,120 B1 | 11/2005 | Bjornsen | |
| 6,970,126 B1 | 11/2005 | O'Dowd et al. | |
| 7,006,078 B2 | 2/2006 | Kim | |
| 7,031,886 B1 | 4/2006 | Hargreaves | |
| 7,032,051 B2 | 4/2006 | Reay et al. | |
| 7,046,230 B2 | 5/2006 | Zadesky et al. | |
| 7,068,039 B2 | 6/2006 | Parker | |
| 7,075,316 B2 | 7/2006 | Umeda et al. | |
| 7,078,916 B2 | 7/2006 | Denison | |
| 7,098,675 B2 | 8/2006 | Inaba et al. | |
| 7,129,935 B2 | 10/2006 | Mackey | |
| 7,148,704 B2 | 12/2006 | Philipp | |
| 7,158,125 B2 | 1/2007 | Sinclair et al. | |
| 7,235,983 B2 | 6/2007 | O'Dowd et al. | |
| 7,253,643 B1 * | 8/2007 | Seguine | 324/686 |
| 7,262,609 B2 | 8/2007 | Reynolds | |
| 7,288,946 B2 | 10/2007 | Hargreaves et al. | |
| 7,301,350 B2 | 11/2007 | Hargreaves et al. | |
| 7,307,485 B1 | 12/2007 | Snyder et al. | |
| 7,323,886 B2 | 1/2008 | Lee | |
| 7,339,580 B2 | 3/2008 | Westerman et al. | |
| 7,359,816 B2 | 4/2008 | Kumar et al. | |
| 7,375,535 B1 | 5/2008 | Kutz et al. | |
| 7,381,031 B2 | 6/2008 | Kawaguchi et al. | |
| 7,382,139 B2 | 6/2008 | Mackey | |
| 7,417,411 B2 | 8/2008 | Hoffman et al. | |
| 7,417,441 B2 | 8/2008 | Reynolds | |
| 7,423,437 B2 | 9/2008 | Hargreaves et al. | |
| 7,449,895 B2 | 11/2008 | Ely et al. | |
| 7,450,113 B2 | 11/2008 | Gillespie et al. | |
| 7,451,050 B2 | 11/2008 | Hargreaves | |
| 7,453,270 B2 | 11/2008 | Hargreaves et al. | |
| 7,453,279 B2 | 11/2008 | Corbin, Jr. et al. | |
| 7,466,307 B2 | 12/2008 | Trent, Jr. et al. | |
| 7,479,788 B2 | 1/2009 | Bolender et al. | |
| 7,495,659 B2 | 2/2009 | Marriott et al. | |
| 7,499,040 B2 | 3/2009 | Zadesky et al. | |
| 7,521,941 B2 | 4/2009 | Ely et al. | |
| 7,548,073 B2 | 6/2009 | Mackey et al. | |
| 7,598,822 B2 | 10/2009 | Rajagopal et al. | |
| 7,683,641 B2 | 3/2010 | Hargreaves et al. | |
| 7,733,333 B2 * | 6/2010 | Kaliher | H03K 17/955 |
| | | | 178/18.06 |
| 7,772,514 B2 | 8/2010 | Kirmayer | |
| 7,821,274 B2 | 10/2010 | Philipp et al. | |
| 7,825,910 B2 | 11/2010 | Won | |
| 8,040,321 B2 | 10/2011 | Peng et al. | |
| 8,058,937 B2 | 11/2011 | Qin et al. | |
| 8,358,226 B2 * | 1/2013 | Reynolds | G06F 3/0202 |
| | | | 178/18.06 |
| 8,581,853 B2 * | 11/2013 | Francis | G06F 3/03547 |
| | | | 178/18.06 |
| 2003/0091220 A1 | 5/2003 | Sato et al. | |
| 2004/0007566 A1 * | 1/2004 | Staebler et al. | 219/445.1 |
| 2004/0178989 A1 | 9/2004 | Shahoian et al. | |
| 2004/0217945 A1 | 11/2004 | Miyamoto et al. | |
| 2004/0239616 A1 | 12/2004 | Collins | |
| 2005/0031175 A1 | 2/2005 | Hara et al. | |
| 2005/0052429 A1 | 3/2005 | Philipp | |
| 2005/0159126 A1 | 7/2005 | Wang | |
| 2005/0179672 A1 | 8/2005 | Chiu et al. | |
| 2006/0016800 A1 * | 1/2006 | Paradiso et al. | 219/497 |
| 2006/0038793 A1 | 2/2006 | Philipp | |
| 2006/0097992 A1 | 5/2006 | Gitzinger et al. | |
| 2006/0131159 A1 | 6/2006 | Kaps et al. | |
| 2006/0197750 A1 | 9/2006 | Kerr et al. | |
| 2006/0227117 A1 | 10/2006 | Proctor | |
| 2006/0232559 A1 * | 10/2006 | Chien et al. | 345/168 |
| 2006/0238205 A1 * | 10/2006 | Francis | 324/658 |
| 2006/0262101 A1 | 11/2006 | Layton et al. | |
| 2007/0076897 A1 | 4/2007 | Philipp | |
| 2007/0229468 A1 * | 10/2007 | Peng et al. | 345/173 |
| 2007/0247443 A1 | 10/2007 | Philipp | |
| 2007/0257894 A1 | 11/2007 | Philipp | |
| 2007/0268265 A1 | 11/2007 | Xiaoping | |
| 2007/0268273 A1 | 11/2007 | Westerman et al. | |
| 2007/0268274 A1 | 11/2007 | Westerman et al. | |
| 2007/0268275 A1 | 11/2007 | Westerman et al. | |
| 2007/0291013 A1 | 12/2007 | Won | |
| 2007/0296694 A1 | 12/2007 | Kim et al. | |
| 2007/0296709 A1 | 12/2007 | Guanghai | |
| 2008/0007534 A1 | 1/2008 | Peng et al. | |
| 2008/0024455 A1 | 1/2008 | Lee et al. | |
| 2008/0036473 A1 | 2/2008 | Jansson | |
| 2008/0041639 A1 | 2/2008 | Westerman et al. | |
| 2008/0041640 A1 | 2/2008 | Gillespie et al. | |
| 2008/0042986 A1 | 2/2008 | Westerman et al. | |
| 2008/0042987 A1 | 2/2008 | Westerman et al. | |
| 2008/0042988 A1 | 2/2008 | Westerman et al. | |
| 2008/0042989 A1 | 2/2008 | Westerman et al. | |
| 2008/0042994 A1 | 2/2008 | Gillespie et al. | |
| 2008/0068100 A1 | 3/2008 | Goodnow et al. | |
| 2008/0111714 A1 | 5/2008 | Kremin | |
| 2008/0116904 A1 | 5/2008 | Reynolds et al. | |
| 2008/0128182 A1 | 6/2008 | Westerman et al. | |

(56) References Cited

U.S. PATENT DOCUMENTS

2008/0179112 A1 7/2008 Qin et al.
2008/0278178 A1 11/2008 Philipp
2009/0128374 A1* 5/2009 Reynolds ............ G06F 3/0202
341/33

OTHER PUBLICATIONS

"The Virtual Keyboard: I-Tech Bluetooth/Serial Virtual Laser Keyboard Available Now!" The Virtual Laser Keyboard (VKB) Online Worldwide Shop, <http://www.virtual-laser-keyboard.com>, downloaded Apr. 13, 2006; 4 pages.
Adam Chapweske, "The PS/2 Mouse Interface," Copyright 2001; 10 pages.
U.S. Appl. No. 11/493,350: "Technique for Increasing the Sensitivity of Capacitive Sensor Arrays," Lee et al., filed Jul. 25, 2006; 48 pages.
Chris Mack, "Semiconductor Lithography—The Basic Process," Gentleman Scientist, downloaded Apr. 20, 2006, http://www.lithoguru.com/scientist/lithobasics.html; 12 pages.
Cypress Semiconductor Corporation, "CY8C21x34 Data Sheet," CSR User Module, CSR V.1.0; Oct. 6, 2005; 36 pages.
Dennis Seguine, "Capacitive Switch Scan," Cypress Application Note AN2233a, Revision B, Apr. 14, 2005; 6 pages.
Mark Lee, "CapSense Best Practices," Cypress Application Note AN2394; Oct. 19, 2006; 10 pages.
Ryan Seguine et al., "Layout Guidelines for PSoC CapSense", Cypress Application Note AN2292, Revision B, Oct. 31, 2005, pp. 1-15.
The Authoritative Dictionary of IEEE Standards Terms, 2000, IEEE Press Publications, 7th Edition, pp. 1133-1134; 4 pages.
USPTO Advisory Action for U.S. Appl. No. 11/230,719 dated Nov. 30, 2007; 3 pages.
USPTO Advisory Action for U.S. Appl. No. 11/395,417 dated Jul. 6, 2007; 3 pages.
USPTO Advisory Action for U.S. Appl. No. 11/437,517 dated Apr. 7, 2010; 3 pages.
USPTO Advisory Action for U.S. Appl. No. 11/477,179 dated Jun. 7, 2010; 3 pages.
USPTO Advisory Action for U.S. Appl. No. 12/367,279 dated Jun. 25, 2010; 3 pages.
USPTO Final Rejection for U.S. Appl. No. 11/230,719 dated Sep. 7, 2007; 9 pages.
USPTO Final Rejection for U.S. Appl. No. 11/273,708 dated Jul. 5, 2007; 8 pages.
USPTO Final Rejection for U.S. Appl. No. 11/395,417 dated Apr. 24, 2007; 9 pages.
USPTO Final Rejection for U.S. Appl. No. 11/437,517 dated Jan. 26, 2010; 11 pages.
USPTO Final Rejection for U.S. Appl. No. 11/477,179 dated Apr. 1, 2010; 10 pages.
USPTO Final Rejection for U.S. Appl. No. 11/477,179 dated Nov. 24, 2010; 10 pages.
USPTO Final Rejection for U.S. Appl. No. 11/484,085 dated Mar. 16, 2010; 7 pages.
USPTO Final Rejection for U.S. Appl. No. 11/502,267 dated Feb. 3, 2009; 10 pages.
USPTO Final Rejection for U.S. Appl. No. 11/600,896 dated Sep. 30, 2010; 19 pages.
USPTO Final Rejection for U.S. Appl. No. 12/367,279 dated Apr. 1, 2010; 6 pages.
USPTO Non final Rejection for U.S. Appl. No. 13/442,716 dated Sep. 19, 2012; 8 pages.
USPTO Non-Final Rejection for U.S. Appl. No. 11/230,719 dated Jan. 16, 2007; 8 pages.
USPTO Non-Final Rejection for U.S. Appl. No. 11/230,719 dated May 11, 2006; 5 pages.
USPTO Non-Final Rejection for U.S. Appl. No. 11/230,719 dated May 25, 2007; 6 pages.
USPTO Non-Final Rejection for U.S. Appl. No. 11/230,719 dated Aug. 28, 2006; 7 pages.
USPTO Non-Final Rejection for U.S. Appl. No. 11/273,708 dated Mar. 19, 2007; 16 pages.
USPTO Non-Final Rejection for U.S. Appl. No. 11/395,417 dated Apr. 25, 2008; 7 pages.
USPTO Non-Final Rejection for U.S. Appl. No. 11/395,417 dated Oct. 26, 2006; 13 pages.
USPTO Non-Final Rejection for U.S. Appl. No. 11/395,417 dated Nov. 1, 2007; 8 pages.
USPTO Non-Final Rejection for U.S. Appl. No. 11/437,517 dated Aug. 3, 2010; 10 pages.
USPTO Non-Final Rejection for U.S. Appl. No. 11/437,517 dated Aug. 5, 2009; 9 pages.
USPTO Non-Final Rejection for U.S. Appl. No. 11/442,212 dated Feb. 25, 2011; 13 pages.
USPTO Non-Final Rejection for U.S. Appl. No. 11/477,179 dated Jun. 9, 2009; 13 pages.
USPTO Non-Final Rejection for U.S. Appl. No. 11/477,179 dated Jul. 20, 2010; 10 pages.
USPTO Non-Final Rejection for U.S. Appl. No. 11/477,179 dated Nov. 18, 2009; 10 pages.
USPTO Non-Final Rejection for U.S. Appl. No. 11/484,085 dated Sep. 17, 2009; 8 pages.
USPTO Non-Final Rejection for U.S. Appl. No. 11/493,350 dated Jun. 16, 2010; 8 pages.
USPTO Non-Final Rejection for U.S. Appl. No. 11/493,350 dated Nov. 9, 2010; 9 pages.
USPTO Non-Final Rejection for U.S. Appl. No. 11/502,267 dated Aug. 11, 2008; 10 pages.
USPTO Non-Final Rejection for U.S. Appl. No. 11/600,255 dated Mar. 29, 2010; 10 pages.
USPTO Non-Final Rejection for U.S. Appl. No. 11/600,896 dated Jan. 26, 2011; 12 pages.
USPTO Non-Final Rejection for U.S. Appl. No. 11/600,896 dated May 14, 2010; 15 pages.
USPTO Non-Final Rejection for U.S. Appl. No. 11/600,896 dated Dec. 16, 2009; 13 pages.
USPTO Non-Final Rejection for U.S. Appl. No. 11/700,314 dated Mar. 26, 2010; 7 pages.
USPTO Non-Final Rejection for U.S. Appl. No. 12/367,279 dated Oct. 29, 2009; 8 pages.
USPTO Notice of Allowance for U.S. Appl. No. 11/230,719 dated Jan. 16, 2008; 4 pages.
USPTO Notice of Allowance for U.S. Appl. No. 11/273,708 dated Aug. 9, 2007; 4 pages.
USPTO Notice of Allowance for U.S. Appl. No. 11/395,417 dated Nov. 6, 2008; 7 pages.
USPTO Notice of Allowance for U.S. Appl. No. 11/437,517 dated Feb. 3, 2011; 10 pages.
USPTO Notice of Allowance for U.S. Appl. No. 11/437,517 dated May 19, 2011; 9 pages.
USPTO Notice of Allowance for U.S. Appl. No. 11/437,517 dated Jun. 16, 2011; 9 pages.
USPTO Notice of Allowance for U.S. Appl. No. 11/484,085 dated Jun. 10, 2010; 4 pages.
USPTO Notice of Allowance for U.S. Appl. No. 11/489,944 dated Apr. 9, 2007; 7 pages.
USPTO Notice of Allowance for U.S. Appl. No. 11/489,944 dated May 24, 2007; 2 pages.
USPTO Notice of Allowance for U.S. Appl. No. 11/600,255 dated Jul. 27, 2010; 6 pages.
USPTO Notice of Allowance for U.S. Appl. No. 11/700,314 dated Sep. 16, 2010; 8 pages.
USPTO Notice of Allowance for U.S. Appl. No. 12/367,279 dated Aug. 23, 2010; 7 pages.
USPTO Notice of Allowance for U.S. Appl. No. 13/204,543 dated Feb. 7, 2012; 8 pages.
USPTO Notice of Allowance for U.S. Appl. No. 13/204,543 dated Mar. 15, 2012; 9 pages.
USPTO Notice of Allowance for U.S. Appl. No. 13/442,716 dated Apr. 22, 2013; 10 pages.

(56) References Cited

OTHER PUBLICATIONS

USPTO Notice of Allowance for U.S. Appl. No. 13/442,716 dated Jun. 24, 2013; 10 pages.
USPTO Notice of Allowance for U.S. Appl. No. 13/442,716 dated Dec. 12, 2012; 9 pages.
Wikipedia, The Free Encyclopedia, "IBM PC Keyboard," <http://en.wikipedia.org/wiki/PC_keyboard> accessed May 19, 2006; 3 pages.

* cited by examiner

APPARATUS AND METHODS FOR DETECTING A CONDUCTIVE OBJECT AT A LOCATION

RELATED MATTERS

This application is a continuation of U.S. application Ser. No. 13/442,716, filed Apr. 9, 2012, which is a continuation of U.S. patent application Ser. No. 13/204,543, filed Aug. 5, 2011, now U.S. Pat. No. 8,174,507, issued May 8, 2012, which claims the benefit of U.S. application Ser. No. 11/437,517, filed May 18, 2006, now U.S. Pat. No. 8,004,497, issued Aug. 23, 2011, all of which are incorporated by reference herein in their entirety.

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that is common is a touch-sensor button. A basis touch-sensor button emulates the function of a mechanical button. Touch-sensor buttons may be embedded into different types of operational panels of electronic devices. For example, touch-sensor buttons may be used on operational or control panels of household appliances, consumer electronics, mechanical devices, and the like. Touch-sensor buttons may also be used in conjunction with, or in place of, other user input devices, such as keyboards, mice, trackballs, or the like.

FIG. 1A illustrates a conventional sensing device having three touch-sensor buttons. Conventional sensing device 100 includes button 101, button 102, and button 103. These buttons are conventional touch-sensor buttons. These three buttons may be used for user input using a conductive object, such as a finger.

FIG. 1B illustrates a conventional sensing device of three touch-sensor buttons 101-103 coupled to a processing device 110. Processing device 110 is used to detect whether a conductive object is present on either, or none, of the touch-sensor buttons 101-103. To detect the presence of the conductive object, the processing device 110 may include capacitance sensors 104-106, which are coupled to buttons 101-103, respectively. The capacitance sensors of the processing device are coupled to the touch-sensor buttons in a one-to-one configuration. Accordingly, the processing device 110 scans the touch-sensor buttons 101-103 using the capacitance sensors 104-106, and measures the capacitance on the touch-sensor buttons 101-103.

Each of the conventional touch-sensor buttons 101-103 may be made of a sensor element of conductive material, such as copper-clad. The conductive material may be form shaped in a circular shape (illustrated in FIG. 1A), or even in a rectangular shape (illustrated in FIG. 1B). The touch-sensor buttons may be capacitance sensor buttons, which may be used as non-contact switches. These switches, when protected by an insulating layer, offer resistance to severe environments.

It should be noted that the conventional configuration of FIG. 1B includes a one-to-one configuration of touch-sensor buttons to capacitance sensors. There are other conventional configurations that may use less capacitance sensors to measure the capacitance on the three touch-sensor buttons. These conventional configurations, however, still require a one-to-one configuration of pins to touch-sensor buttons. Accordingly, by adding more buttons, the processing device needs to have more pins to correspond to the one-to-one configuration of pins to touch-sensor buttons. Similarly, by increasing the pin count, the scan time to scan the sensor elements increases. In addition, the memory of the processing device, which may be used to store program data and/or temporary data (e.g., raw measurement data, differential counts, baseline measurement data, and the like), increases by increasing the pin count.

BRIEF DESCRIPTION OF THE DRAWINGS

The present invention is illustrated by way of example, and not by way of limitation, in the figures of the accompanying drawings.

DETAILED DESCRIPTION

Figure 1A:
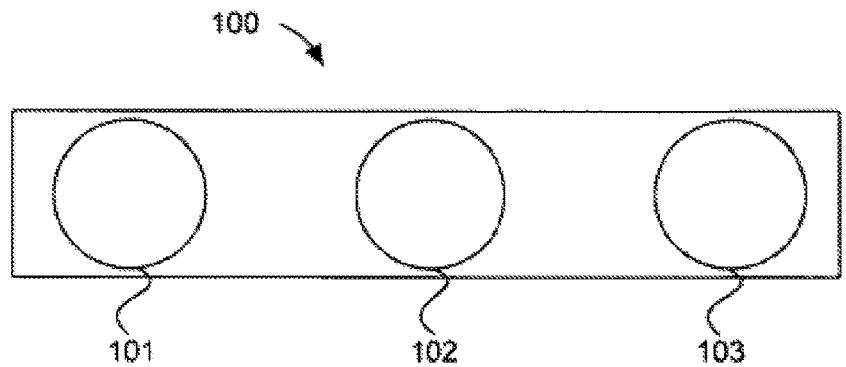
FIG. 1A illustrates a conventional sensing device having three touch-sensor buttons.
Figure 1B:
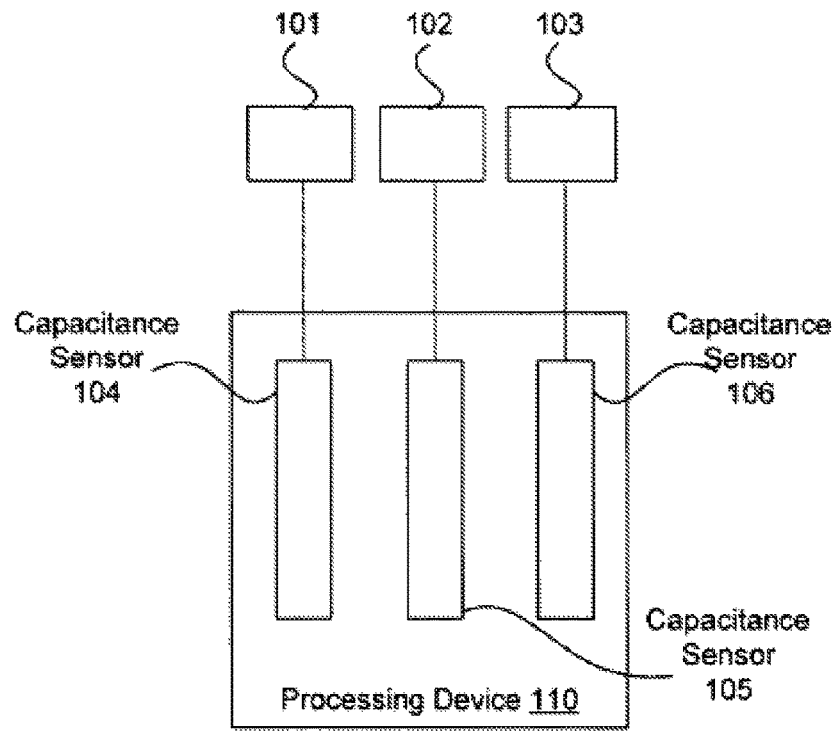
FIG. 1B illustrates a conventional sensing device of three touch-sensor buttons coupled to a processing device.

Described herein is an apparatus and method for detecting a presence of a conductive object on a sensing device, and recognizing three or more button operations performed by the conductive object using two sensing areas of the sensing device. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to recognize three or more button operations performed by the conductive object on three or more sensor elements that are coupled to two pins of a processing device. In one embodiment, the apparatus may include a sensing device (e.g., touch-sensor button) that has first, second, and third sensor elements. The third sensor element has a first portion coupled to the first sensor element, and a second portion coupled to the second sensor element. These portions of the third sensor element are electrically isolated from one another.

The embodiments describe herein permit the expansion of additional buttons (e.g., three or more total buttons) to the sensing device, while using only two pins on the processing device. Conversely, since the conventional configuration has implemented a one-to-one configuration of sensor elements to pins of the processing device, each button added requires an additional pin on the processing device. Using only two pins, the scan time does not increase by adding additional buttons to implement three or more buttons on the sensing device. By maintaining two pins for three or more buttons, the scan time to scan the sensor elements is not increased. In other words, more buttons may be implemented without increasing the total scan time of the sensing device. Similarly, the memory of the processing device is not increased to accommodate additional program data and/or temporary data (e.g., raw measurement data, differential counts, baseline measurement data, and the like) for the additional buttons.

The sensing device may use two capacitive switch relaxation oscillator (CSR) pins of a processing device to realize more than two buttons on the sensing device. For example, the three or more buttons may be realized by using two sensing areas. Each sensing area may include a bar of conductive material and several interconnected sub-bars. The sub-bars of the two sensing areas are interleaved and are electrically isolated. In other words, one set of interconnected sub-bars are connected to one pin, while the other set is coupled to the other pin. The two sensing areas make up three or more sensor elements that are used to form the touch-sensor buttons. The different buttons contain different percentages of surface area of the sensing areas. Alternatively, each sensing area may include two or more bars of conductive material with or without several interconnected sub-bars.

For example, a three-button scheme using two pins includes one sensor element that has 100% of the first sensing area, the second sensor element has 50% of the first sensing area and 50% of the second sensing area, and the third sensor element has 100% of the second sensing area. Accordingly, by scanning and measuring the capacitance (e.g., capacitance variation of the capacitance minus the baseline, as described below) on the two pins to detect the presence of the conductive object, the processing device can distinguish between the presence of the conductive object on the first, second, and third sensor elements. For example, if the capacitance variation $\delta_1$, measured on the first pin, is greater than zero, and the capacitance variation $\delta_2$, measured on the second pin is equal to approximately zero, then the first button has been pressed. Similarly, if the capacitance variation $\delta_1$, measured on the first pin, is equal to the capacitance variation $\delta_2$, measured on the second pin, then the second button has been pressed. If the capacitance variation $\delta_1$, measured on the first pin, is equal to approximately zero, and the capacitance variation $\delta_2$, measured on the second pin is greater than zero, then the third button has been pressed.

The embodiments herein may be beneficial to help reduce the pin count of the processing device. This may decrease the complexity of the processing device, or allow the processing device to support additional functionality, such as cursor positioning and selecting functionality, keyboard functionality, slider functionality, or the like. Furthermore, the embodiments may be beneficial to help reduce the scan time of the sensing device. Using two pins of the processing device to measure the capacitance on two sensing areas to realize three or more buttons is faster than measuring the capacitance on three or more touch-sensor buttons of the conventional configuration (e.g., one-to-one configuration). In addition, using two pins reduces the RAM/FLASH space needed in the sensing device, as compared to the conventional configuration.

The embodiments described herein may be used in different types of operational panels of electronic devices. For example, touch-sensor buttons may be used on operational or control panels of household appliances, consumer electronics, mechanical devices, and the like. Touch-sensor buttons may also be used in conjunction with, or in place of, other user input devices, such as keyboards, mice, trackballs, or the like.

Figure 2:
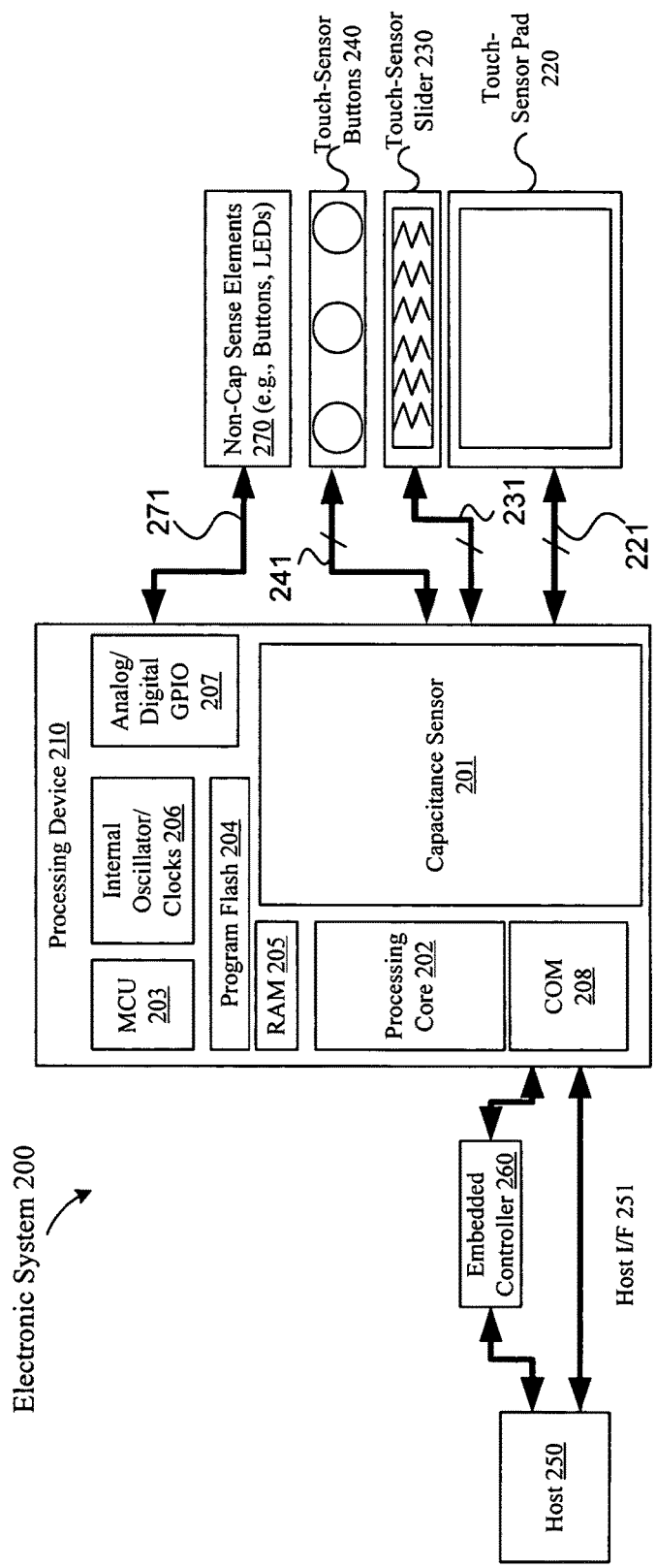
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch-sensor slider 230, or a touch-sensor button 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a predefined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
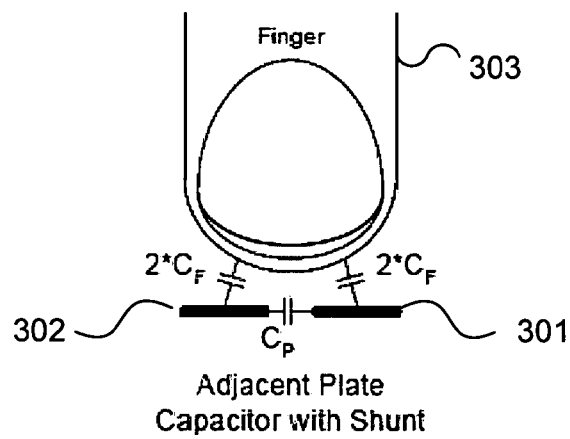
FIG. 3A illustrates a varying switch capacitance.
Figure 3B:
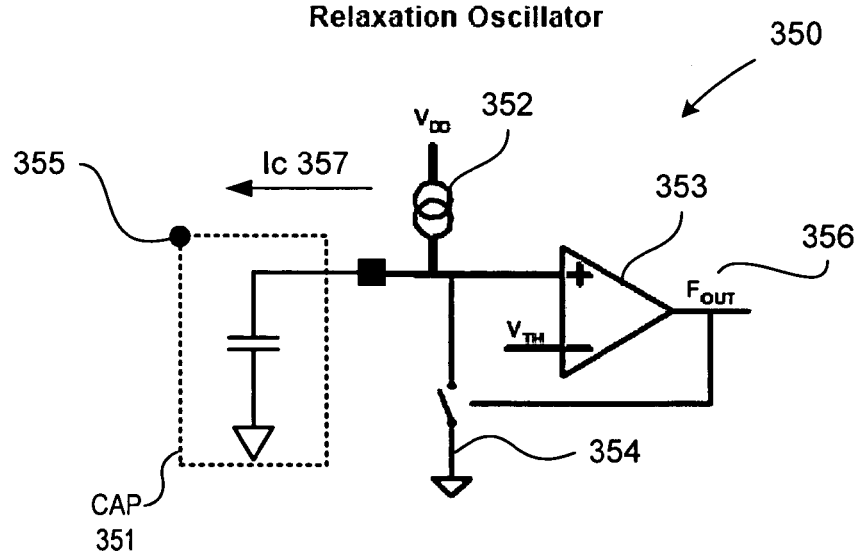
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (Cf). Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV=I_C dt \quad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
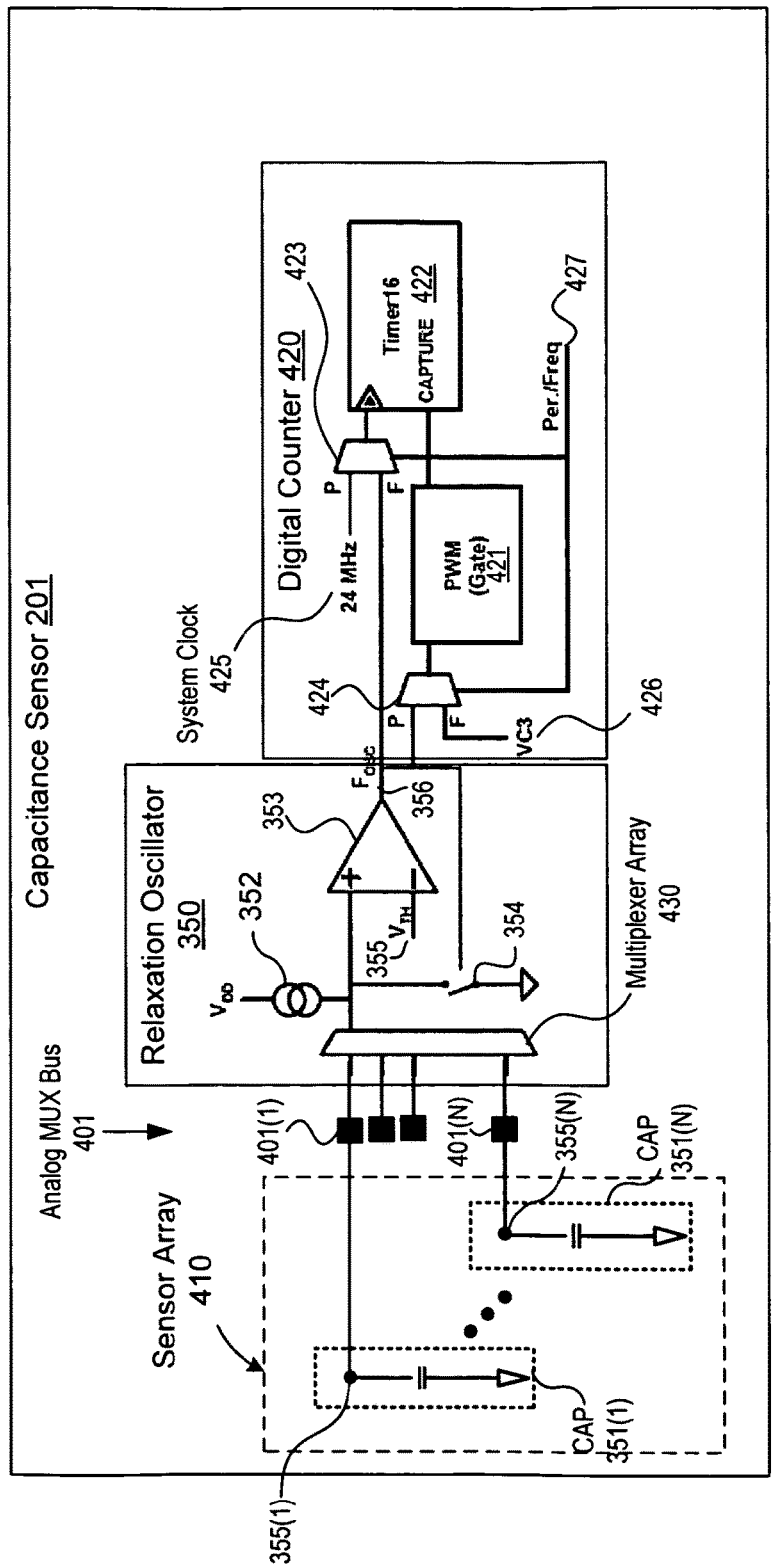
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \tag{4}$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for $\Delta n$ to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \tag{5}$$

Adding some margin to yield 2500 counts, and running the frequency measurement method at 1.0 MHz, the detection time for the switch is approximately 2.5 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \tag{7}$$

The charge currents are typically lower and the period is longer to increase sensitivity, or the number of periods for which $f_{sysClk}$ is counted can be increased. In either method, by matching the static (parasitic) capacitances Cp of the individual switches, the repeatability of detection increases, making all switches work approximately at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent sensor elements that are electrically isolated (e.g., PCB pads or traces), as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{pF/m} \tag{8}$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \qquad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™ Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
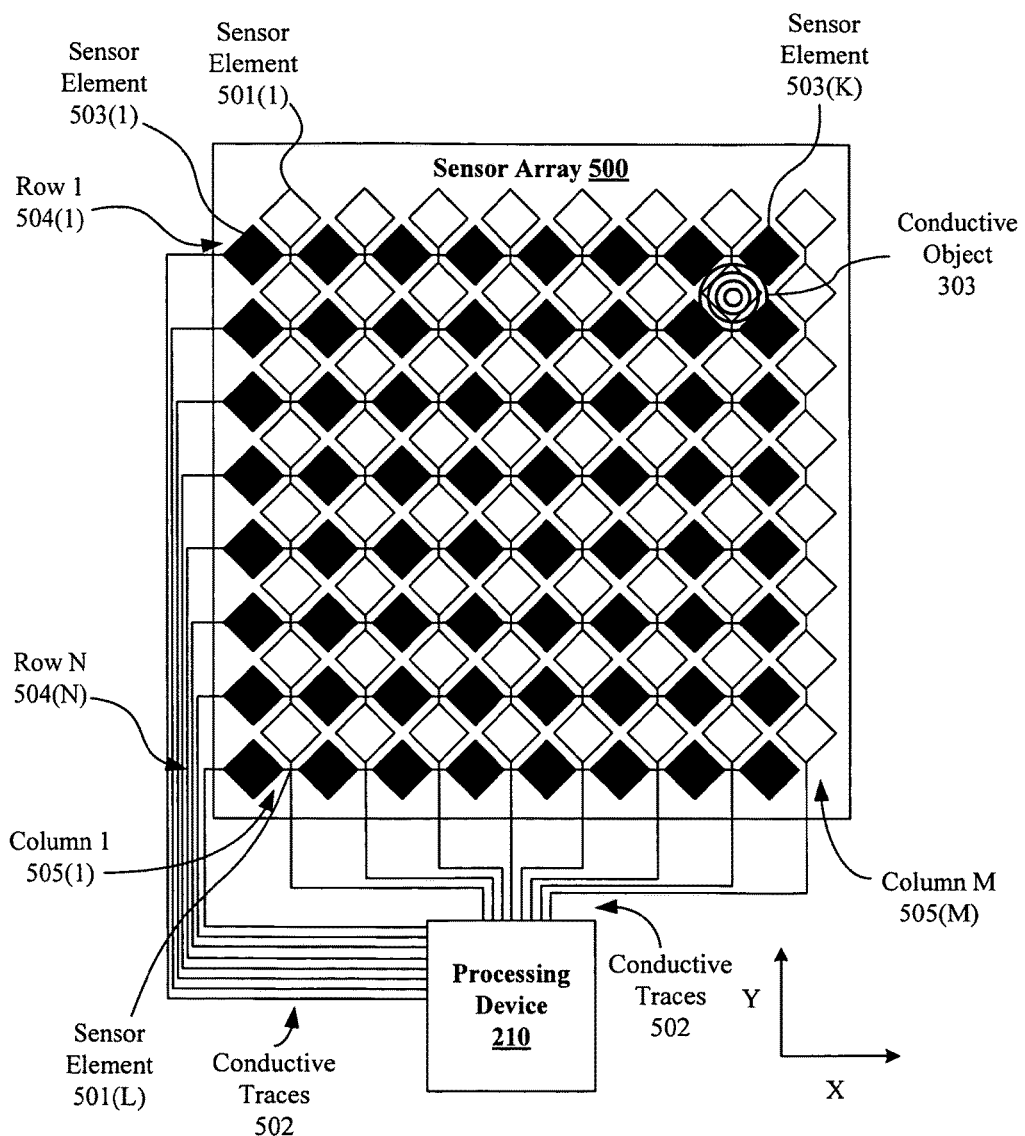
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array having a plurality of sensor elements for detecting a presence of a conductive object 303 on the sensor array 500 of a touch-sensor pad. Touch-sensor pad 220 includes a sensor array 500. Sensor array 500 includes a plurality of rows 504(1)-504(N) and a plurality of columns 505(1)-505(M), where N is a positive integer value representative of the number of rows and M is a positive integer value representative of the number of columns. Each row includes a plurality of sensor elements 503(1)-503(K), where K is a positive integer value representative of the number of sensor elements in the row. Each column includes a plurality of sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
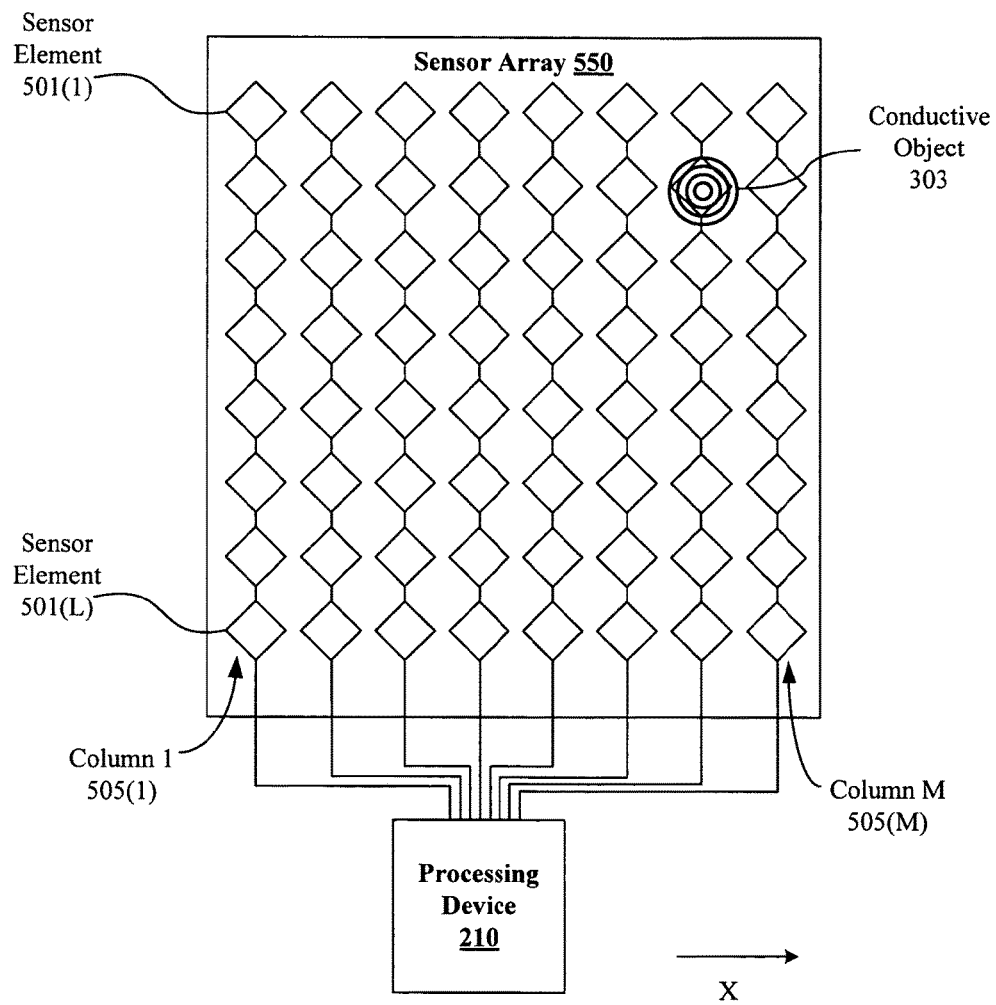
FIG. 5B illustrates a top-side view of one embodiment of a sensor array having a plurality of sensor elements for detecting a presence of a conductive object on the sensor array of a touch-sensor slider

FIG. 5B illustrates a top-side view of one embodiment of a sensor array having a plurality of sensor elements for detecting a presence of a conductive object 303 on the sensor array 550 of a touch-sensor slider. Touch-sensor slider 230 includes a sensor array 550. Sensor array 550 includes a plurality of columns 504(1)-504(M), where M is a positive integer value representative of the number of columns. Each column includes a plurality of sensor elements 501(1)-501 (L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
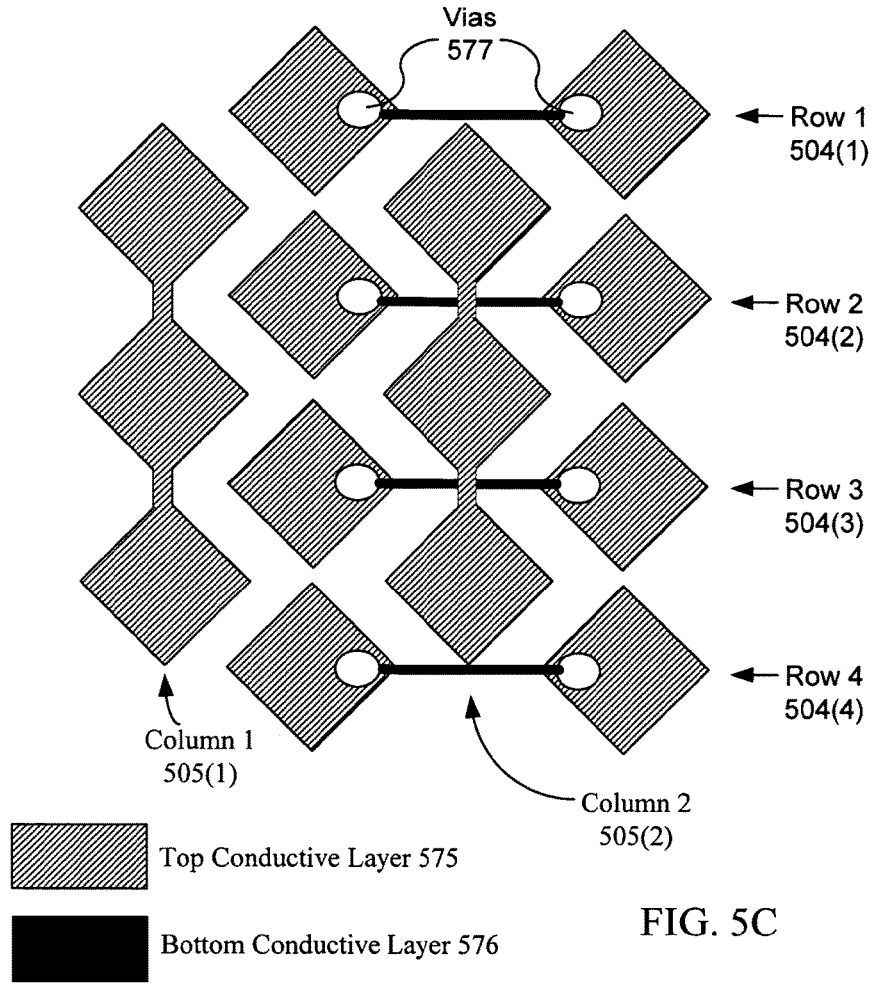
FIG. 5C illustrates a top-side view of one embodiment of a two-layer touch-sensor pad.
Figure 5D:
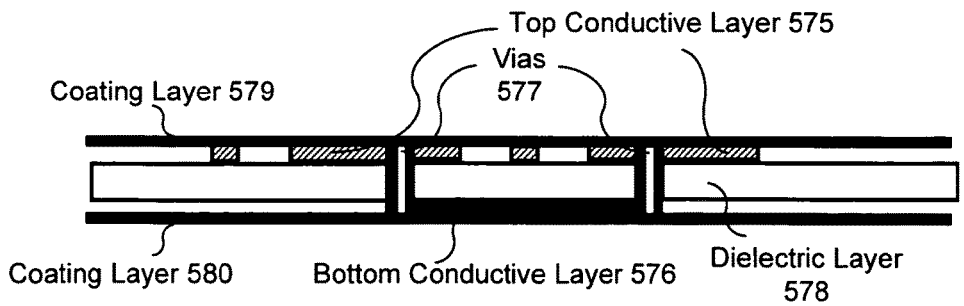
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 589 are applied to the surfaces opposite to the surfaces that are coupled to the dielectric layer 578 on both the top and bottom conductive layers 575 and 576.

It should be noted that the space between coating layers 579 and 589 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6A:
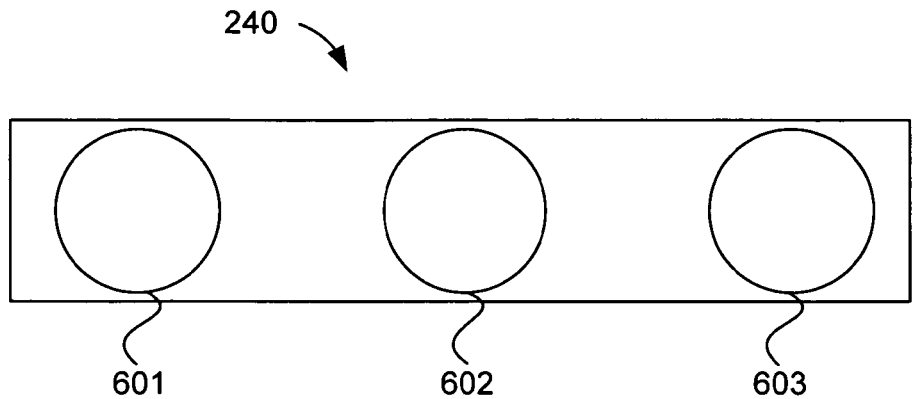
FIG. 6A illustrates one embodiment of a sensing device having three touch-sensor buttons.

FIG. 6A illustrates one embodiment of a sensing device having three touch-sensor buttons. Sensing device 240 of FIG. 6A includes buttons 601, 602, and 603. These three buttons may be used for user input using a conductive object, such as a finger.

Figure 6B:
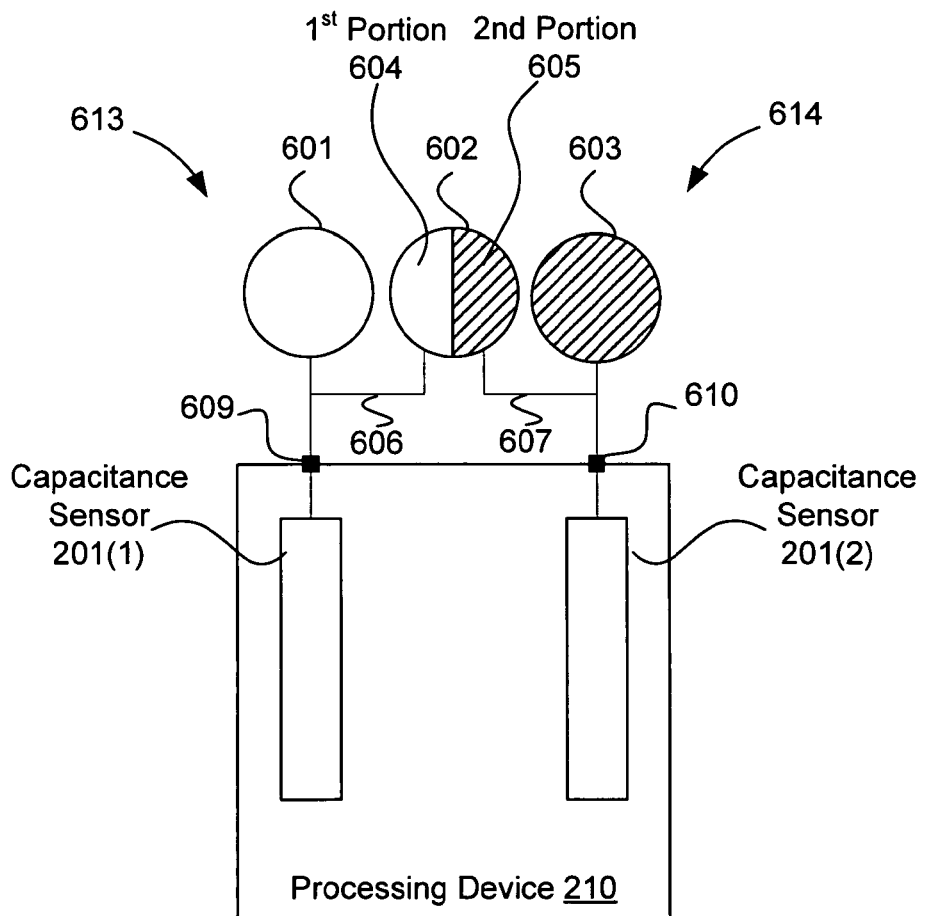
FIG. 6B illustrates one embodiment of the sensing device of FIG. 6A coupled to a processing device.

FIG. 6B illustrates one embodiment of the sensing device of FIG. 6A coupled to a processing device 210. Processing device 210 is used to detect whether a conductive object is present on either, or none, of the touch-sensor buttons 601-603. To detect the presence of the conductive object, the processing device 210 may include capacitance sensors 201(1) and 201(2), which are coupled to buttons 601-603. In particular, button 601 is coupled to capacitance sensor 201(1), button 603 is coupled to capacitance sensor 201(2), and button 602 is coupled to both capacitance sensor 201(1) and 201(2).

Each of the conventional touch-sensor buttons 601-603 may be made of a sensor element of conductive material, such as copper-clad. The conductive material may be formed in a circular shape (illustrated in FIGS. 6A-6D), in a rectangular shape, or in a square shape (illustrated in FIGS. 7A and 7B). The touch-sensor buttons may be capacitance sensor buttons, which may be used as non-contact switches. These switches, when protected by an insulating layer, offer resistance to severe environments.

The sensing device of FIG. 6B includes two sensing areas 613 and 614 of conductive material that are electrically isolated. The sensing areas of conductive area are used to make up the three buttons 601-603. In particular, button 601 includes a sensor element having a surface area of one conductive material (illustrated as white surface area of button 601). Similarly, button 603 includes a sensor element having a surface area of another conductive material (illustrated as hashed surface area of button 603). The conductive materials may be similar or dissimilar materials, but more importantly, are electrically isolated from one another. For example, button 601 is coupled to a first pin 609, and button 603 is coupled to a second pin 610 of processing device 210. Button 602, however, includes a sensor element having a surface area of two conductive materials (illustrated as white and hashed surface areas of button 603) that are electrically isolated. A portion, first portion 604, of the sensor element of button 602 is coupled to the conductive material of button 601, and another portion, second portion 605, is coupled to the conductive material of button 603.

In one embodiment, first portion 604 is coupled to the sensor element of button 601 using a conductive line 606, and second portion 605 is coupled to the sensor element button 603 using a conductive line 607. The conductive lines 606 and 607 may be conductive traces printed on the surface of the PCB. Alternatively, conductive lines may be conductive paths of conductive material that coupled the conductive material of the sensor elements and to the pins of the processing device 210.

The processing device 210 scans the touch-sensor buttons 601-603 using the capacitance sensors 201(1) and 201(2), and measures the capacitance on the two sensing areas of conductive material that realize the touch-sensor buttons 601-603. The processing device is operable to recognize a first button operation on the first sensor element, a second button operation on the second sensor element, and third button operation on the first and second portions of the third sensor element. Accordingly, the capacitance sensors of the processing device are not coupled to the touch-sensor buttons in a one-to-one configuration, like that of the conventional sensing device.

In another embodiment, the processing device 210 may include only one capacitance sensor 201 that is coupled to a selection circuit. The selection circuit operates to select one conductive path to scan and measure. The processing device 210 includes two pins to couple to the two sensing areas of conductive material that make up the three or more buttons. In another embodiment, the processing device 210 may include only one pin and be coupled to a selection circuit that is external to the processing device that selects between the two sensing areas of conductive material.

In one embodiment, the processing device that is coupled to the sensing device of three or more touch-sensor buttons includes one more capacitance sensors coupled to the first and second sensor elements. The one or more capacitance sensors are operable to measure capacitance on the three or more sensor elements. For example, if the capacitance variation $\delta_1$, measured on the first pin 609, is greater than zero, and the capacitance variation $\delta_2$, measured on the second pin 610 is equal to approximately zero, then the first button 601 has been pressed. Similarly, if the capacitance variation $\delta_1$, measured on the first pin 609, is equal to the capacitance variation $\delta_2$, measured on the second pin 610, then the second button 602 has been pressed. If the capacitance variation $\delta_1$, measured on the first pin 609, is equal to approximately zero, and the capacitance variation $\delta_2$, measured on the second pin 610 is greater than zero, then the third button 603 has been pressed.

In one embodiment, the one or more capacitance sensors (e.g., 201(1) and 201(2)) may include a relaxation oscillator. The relaxation oscillator may be similar to the relaxation oscillator described above, which includes a current source, a selection circuit, a comparator, and a reset switch. The relaxation oscillator may be coupled to a digital counter that is operable to count at least one of a frequency or a period of a relaxation oscillator output received from the relaxation oscillator.

In one embodiment, the method may be performed by detecting a presence of a conductive object on a sensing device, and recognizing three or more button operations performed by the conductive object using two sensing areas of the sensing device. In one embodiment, the operation of recognizing the three or more button operations may include recognizing a first button operation when the presence of the conductive object is detected on a first sensing area 613 of the two sensing areas of the sensing device, recognizing a second button operation when the presence of the conductive object is detected on a second sensing area 614 of the two sensing areas of the sensing device, and recognizing one or more button operations when the presence of the conductive object is detected on the first and second sensing areas 613 and 614.

The method may include the operation of determining a capacitance on each of the two sensing areas, and determining the three or more button operations based on the determined capacitance. The sensing areas 613 and 614 may be scanned sequentially, or alternatively, may be scanned simultaneously by one or more capacitance sensors of the processing device 210.

In one embodiment, the two sensing areas may be used to realize three buttons, as illustrated in FIGS. 6A-6D. Alternatively, the two sensing areas may be used to realize more than three button areas. In one embodiment, the sensor elements of the touch-sensor buttons may be circular shaped, as illustrated in FIGS. 6A-6D. Alternatively, the sensor elements may have other shapes, such as rectangles, squares, ovals, hexagon, octagons, or the like.

In one embodiment, portions 613 and 614 are substantially equal in surface area of the sensor element of button 602. Alternatively, portions 613 and 614 are not equal in surface area. In one embodiment, the portions of sensor element of button 602 are semi-circularly shaped. Alternatively, the portions of the sensor element may have other shapes.

Figure 6C:
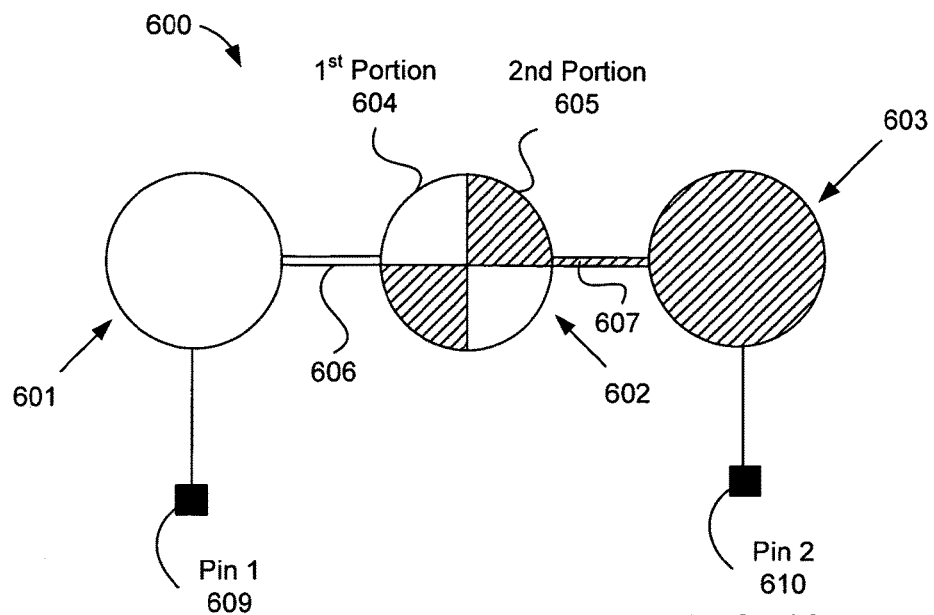
FIG. 6C illustrates another embodiment of a sensing device having three touch-sensor buttons.

FIG. 6C illustrates another embodiment of a sensing device having three touch-sensor buttons. Sensing device 600 includes three touch-sensor buttons that are similar to the touch-sensor buttons 601-603 of FIG. 6B, except the portions of the second sensor element of the second button 602 are dissimilarly shaped than the portions of FIG. 6B. First portion 604 of FIG. 6C has a shape of two pie shapes. Similarly, second portion 605 of FIG. 6C has a shape of two pie shapes. The four pie shapes form a substantially circular shape for the sensor element. In one embodiment, the two pie shapes of each portion are coupled together in a single layer, while the other two pie shapes are coupled together in a second conductive layer using vias, as described with respect to FIGS. 5C & 5D. Alternatively, the conductive material of one portion is coupled together using other methods known by those of ordinary skill in the art.

In the embodiment of FIG. 6C, conductive lines 606 and 607 are conductive traces that couple the first and second portions 604 and 605 to the first and third sensor elements of button 601 and 603, respectively. The conductive lines 607 and 608 may be comprised of similar or dissimilar materials as the conductive material of the sensor elements. It should be noted that first portion 604, sensor element of button 601, and conductive line 606 are electrically isolated from second portion 605, sensor element of button 603, and conductive line 607. Accordingly, the two sensing areas (e.g., 613 and 614) are comprised of these electrically isolated conductive materials.

In one embodiment, the first and second portions 604 and 605 each have a surface area that is substantially equal. Alternatively, the portions may have surface areas in other proportions.

Figure 6D:
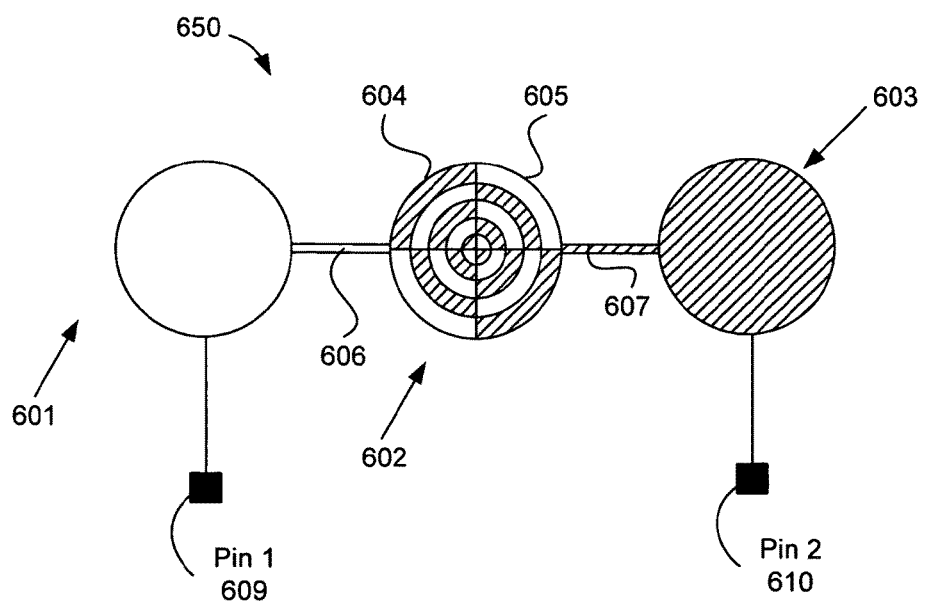
FIG. 6D illustrates another embodiment of a sensing device having three touch-sensor buttons.

FIG. 6D illustrates another embodiment of a sensing device having three touch-sensor buttons. Sensing device 650 includes three touch-sensor buttons that are similar to the touch-sensor buttons 601-603 of FIG. 6B, except the portions of the second sensor element of the second button 602 are dissimilarly shaped than the portions of FIG. 6B. First portion 604 of FIG. 6C has multiple arc shapes of conductive material that are electrically isolated from multiple arc shapes of another conductive material of second portion 605. The multiple arc shapes of both the first and second portions 604 and 605 form a substantially circular shape for the sensor element. In one embodiment, the multiple arc shapes of each portion are coupled together in a single layer, while the other two pie shapes are coupled together in a second conductive layer using vias, as described with respect to FIGS. 5C & 5D. Alternatively, the conductive material of one portion is coupled together using other methods known by those of ordinary skill in the art.

In the embodiment of FIG. 6D, conductive lines 606 and 607 are conductive traces that couple the first and second portions 604 and 605 to the first and third sensor elements of button 601 and 603, respectively. The conductive lines 607 and 608 may be comprised of similar or dissimilar materials as the conductive material of the sensor elements. It should be noted that first portion 604, sensor element of button 601, and conductive line 606 are electrically isolated from second portion 605, sensor element of button 603, and conductive line 607. Accordingly, the two sensing areas (e.g., 613 and 614) are comprised of these electrically isolated conductive materials.

In one embodiment, the first and second portions 604 and 605 each have a surface area that is substantially equal. Alternatively, the portions may have surface areas in other proportions.

The shapes of the sensor elements and the portions of the sensor elements are not limited to the shapes illustrated and described herein, but may include other shapes. For example, FIGS. 7A and 7B include embodiments of rectangular and square shapes for the sensor elements and the portions of the sensor elements. In addition, the number of sensor elements in the sensing device is not limited to three, but may be greater than three. For example, FIGS. 7A and 7B illustrate embodiments of four and five touch-sensor buttons; however, more sensor elements than five may also be used.

Figure 7A:
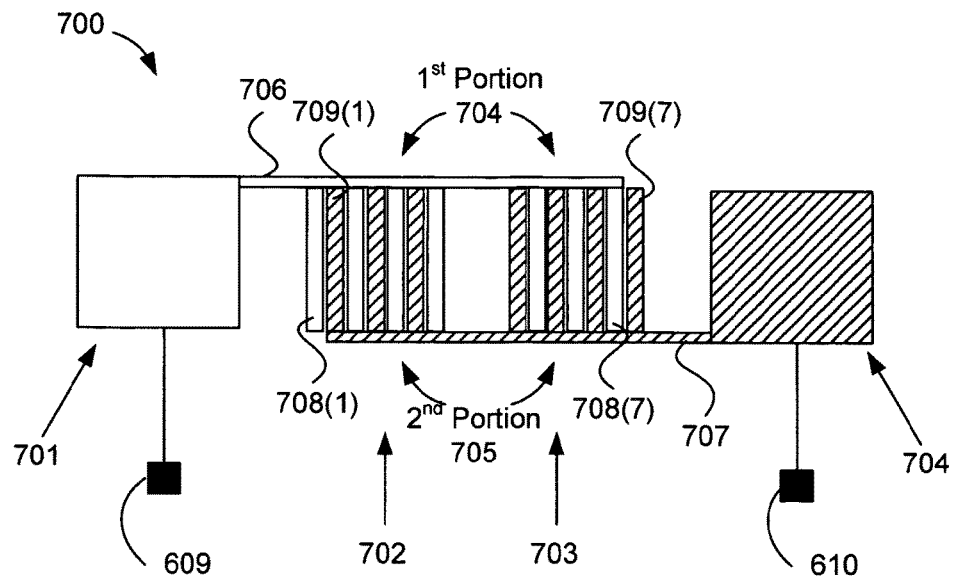
FIG. 7A illustrates another embodiment of a sensing device having four touch-sensor buttons.
Figure 7B:
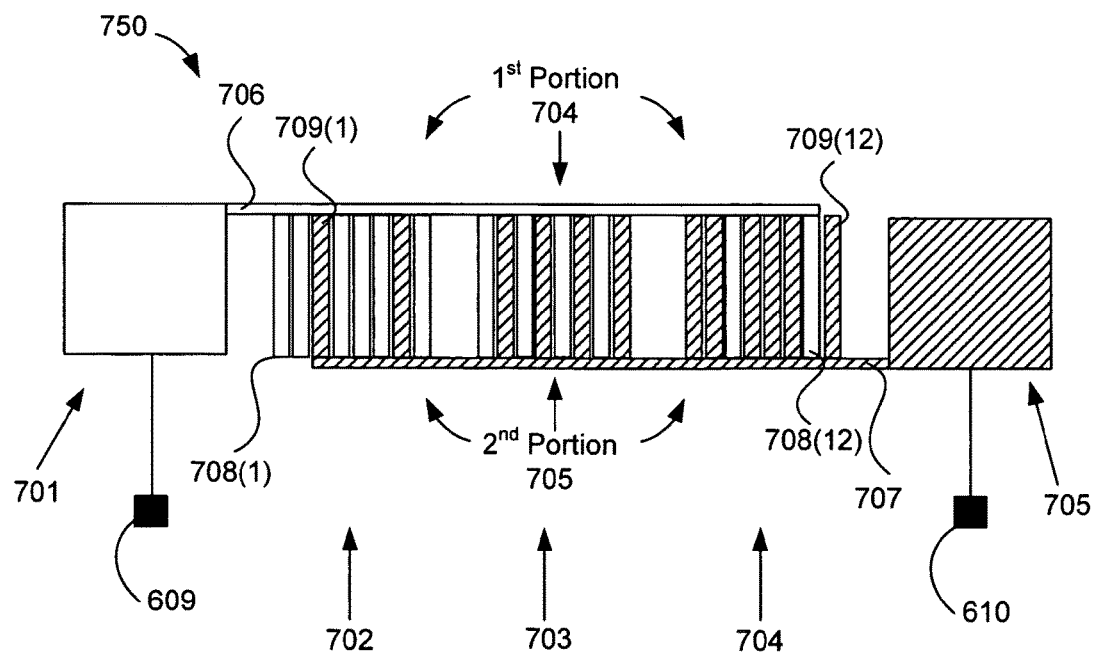
FIG. 7B illustrates another embodiment of a sensing device having five touch-sensor buttons.

FIG. 7A illustrates another embodiment of a sensing device having four touch-sensor buttons. Sensing device 700 includes four touch-sensor buttons 701-704. Each of the conventional touch-sensor buttons 701-704 may be made of a sensor element of conductive material, such as copper-clad. The sensor elements, in this embodiment are square shaped. The touch-sensor buttons may be capacitance sensor buttons, which may be used as non-contact switches.

The sensing device 700 of FIG. 7A includes two sensing areas of conductive material that are electrically isolated. The sensing areas of conductive area are used to make up the four buttons 701-704. In particular, button 701 includes a sensor element having a surface area of one conductive material (illustrated as white surface area of button 701). Similarly, button 704 includes a sensor element having a surface area of another conductive material (illustrated as hashed surface area of button 704). The conductive materials may be similar or dissimilar materials, but more importantly, are electrically isolated from one another. For example, button 701 is coupled to a first pin 609, and button 704 is coupled to a second pin 610 of processing device 210. Buttons 702 and 703, however, include a sensor element having a surface area of two conductive materials (illustrated as white and hashed surface areas of buttons 702 and 703) that are electrically isolated. A portion, first portion 710, of the sensor elements of buttons 702 and 703 is coupled to the conductive material of button 701, and another portion, second portion 711, is coupled to the conductive material of button 704.

In one embodiment, first portion 710 is coupled to the sensor element of button 701 using a conductive line 706, and second portion 711 is coupled to the sensor element button 704 using a conductive line 707. The conductive lines 706 and 707 may be conductive traces printed on the surface of the PCB. Alternatively, conductive lines 706 and 707 may be conductive paths of conductive material that coupled the conductive material of the sensor elements and to the pins of the processing device 210.

In one embodiment, each sensor element of buttons 702 and 703 comprises two surface areas, one surface area being the first portion 710, and the other surface area being the second portion 711. The surface areas may be one solid shape, or alternatively, the surface areas may be interleaved sub-traces. For example, the first conductive line 706 is a first conductive trace, and the first conductive trace has one or more sub-traces (e.g., 708(1)-708(7)), and the second conductive line 707 is a second conductive trace that has one or more sub-traces (e.g., 709(1)-709(7)). In one embodiment, at least one sub-trace of the first conductive trace 706 is interleaved with at least one sub-trace of the second conductive trace 707. Alternatively, the sub-traces of the first and second conductive traces are not interleaved.

The sensor elements of buttons 702 and 703 each have a surface area ratio between the surface area of the first portion 710 and the second portion 711. In one embodiment, the surface area ratio of button 702 is approximately 25% of the first portion 710 to approximately 75% of the second portion 711 (25/75). The surface area ratio of button 703 is approximately 75% of the first portion 710 to approximately 25% of the second portion 711 (75/25). Alternatively, the surface area ratios of buttons 702 and 703 may be switched in surface area ratios, e.g., 75/25 for button 702 and 25/75 for button 703. In another embodiment, button 702 and button 703 may have other surface area ratios, ranging from 99/1 to 49/51, and vice versa.

In the embodiment of FIG. 7A, buttons 702 and 703 each include seven sub-traces, sub-traces 708(1)-708(7) and sub-traces 709(1)-709(7). In particular, button 702 includes four sub-traces 708(1)-708(4) of the first portion 710, and three sub-traces 709(1)-709(3) of the second portion 711. Button 703 includes three sub-traces 708(5)-708(7) of the first portion 710, and four sub-traces 709(4)-709(7) of the second portion 711. Accordingly, the surface area ratio of button 702 is 4/7 of the first portion 710 to 3/7 of the second portion 711, and the surface area ratio of button 703 is 3/7 of the first portion 710 to 4/7 of the second portion 711. Alternatively, other total number of sub-traces, and other combinations of sub-traces, may be used to form the different surface area ratios.

FIG. 7B illustrates another embodiment of a sensing device having five touch-sensor buttons. Sensing device 750 includes five touch-sensor buttons 701-705. The touch-sensor buttons of sensing device 750 are similar to those of sensing device 700, expect there is one additional sensor element, and there are eight sub-traces per sensor element for buttons 702-704, which consequently changes the surface area ratios.

The sensing device 750 of FIG. 7B includes two sensing areas (illustrates a white and hashed surface areas) of conductive material that are electrically isolated. The sensing areas of conductive area are used to make up the five buttons 701-705.

In one embodiment, each sensor element of buttons 702, 703, and 704 comprises two surface areas, one surface area being the first portion 710, and the other surface area being the second portion 711. The surface areas may be one solid shape, or alternatively, the surface areas may be interleaved sub-traces. For example, the first conductive line 706 is a first conductive trace, and the first conductive trace has twelve sub-traces 708(1)-708(12), and the second conductive line 707 is a second conductive trace that has twelve sub-traces 709(1)-709(12). At least two sub-traces of both the first and second conductive traces are interleaved in each sensor element.

In this embodiment, the surface area ratio of button 702 is approximately 6/8 of the first portion 710 to approximately 2/8 of the second portion 711. The surface area ratio of button 703 is approximately 4/8 (25%) of the first portion 710 to approximately 4/8 (50%) of the second portion 711. The surface area ratio of button 704 is approximately 2/8 of the first portion 710 to approximately 6/8 of the second portion 711.

In another embodiment, the surface area ratio of button 702 is approximately 25% of the first portion 710 to approximately 75% of the second portion 711. The surface area ratio of button 703 is approximately 50% of the first portion 710 to approximately 50% of the second portion 711. The surface area ratio of button 704 is approximately 75% of the first portion 710 to approximately 25% of the second portion 711.

In another embodiment, the surface area ratio of button 702 is approximately 33% of the first portion 710 to approximately 67% of the second portion 711. The surface area ratio of button 703 is approximately 50% of the first portion 710 to approximately 50% of the second portion 711. The surface area ratio of button 704 is approximately 67% of the first portion 710 to approximately 33% of the second portion 711.

Alternatively, other surface area ratios, total number of sub-traces, and other combinations of sub-traces, may be used to form the sensor elements that include the two conductive materials.

As described with respect to the embodiments above, the processing device 210 can scan the touch-sensor buttons 701-704 of FIG. 7A (or the touch-sensor buttons 701-705 of FIG. 7B) using one or more capacitance sensors, and measure the capacitance on the two sensing areas of conductive material that realize the touch-sensor buttons 701-704 (or 701-705). Accordingly, the processing device is operable to recognize a first button operation on the first sensor element, a second button operation on the second sensor element, and third and fourth button operations (or third, fourth, and fifth button operations) on the first and second portions of the third and fourth sensor elements (or third, fourth, and fifth sensor elements).

It should be noted that although the sensor elements that include the two portions are illustrated and described as being inside or in between the two sensor elements that are coupled to the pins, the sensor elements that include the two portions may be disposed in other positions with respect to the other two sensor elements.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitance sensor comprising:
   a capacitive sensor array for detecting a presence of a conductive object, the capacitive sensor array comprising at least one first sensor element, at least one second sensor element, and at least one third sensor element, wherein the at least one first sensor element and the at least one second sensor element are single and independent sensor element respectively, wherein the third sensor element comprises of a first portion and a second portion having sensing area equal to sensing area of the first portion, wherein a sensing area of the first sensor element, a sensing area of the second sensor element, and a sensing area of the third sensor element are equal to each other, wherein the sensing area of the first portion of the third sensor element is less than the sensing area of the first sensor element, and the sensing area of the second portion of the third sensor element is less than the sensing area of the first sensor element, wherein the first sensor element and the first portion of the third sensor element are permanently connected together, and the second sensor element and the second portion of the third sensor element are permanently connected together that is electrically isolated from the first conductive material, wherein the first and second portions of the third sensor element are electrically isolated;
   a relaxation oscillator respectively coupled to the first sensor element and the second sensor element to receive input signals representing capacitances on the first, second and third sensor elements, the relaxation oscillator further configured to generate an output signal, wherein the capacitances on the third sensor element is represented by simultaneously receiving the capacitances on the first and second sensor elements; and
   a digital counter coupled to receive the output signal of the relaxation oscillator, the digital counter configured to measure at least one of a frequency and a period of the output signal of the relaxation oscillator.

2. The capacitance sensor of claim 1, wherein the capacitive sensor array is coupled to the relaxation oscillator via an analog bus having a plurality of pins.

3. The capacitance sensor of claim 1, further comprising a selection circuit that is coupled between the capacitive sensor array and the relaxation oscillator.

4. The capacitance sensor of claim 3, wherein the selection circuit is configured to sequentially select a sensor element from the multiple sensor elements to provide charge current to the selected sensor element or to receive an input signal representing capacitance of the selected sensor element.

5. The capacitance sensor of claim 1, wherein the capacitance sensor is configured to simultaneously scan the multiple sensor elements.

6. The capacitance sensor of claim 5, wherein the plurality of rows are scanned simultaneously, and wherein the plurality of columns are scanned simultaneously.

7. The capacitance sensor of claim 5, wherein voltages on the plurality of rows are simultaneously moved while voltages on the plurality of columns are held at a constant voltage in order to obtain a profile of the conductive object in a first dimension.

8. The capacitance sensor of claim 5, wherein voltages on the plurality of rows are simultaneously moved in a positive direction while voltages on the plurality of columns are moved in a negative direction in order to obtain a profile of the conductive object in a first dimension.

9. The capacitance sensor of claim 1, wherein the digital counter comprises a pulse width modulator (PWM) and a timer, the PWM coupled to enable the timer.

10. The capacitance sensor of claim 9 wherein, in order to measure the frequency of the output signal of the relaxation oscillator, the PWM is clocked for a fixed period based on a system clock to generate a gate time and an output of the timer is read to obtain a number of counts during the gate time.

11. The capacitance sensor of claim 9 wherein, in order to measure the period of the output signal of the relaxation oscillator, the PWM is clocked by the output signal of the relaxation oscillator and an output of the timer is read to obtain a number of counts when the PWM is interrupted.

12. A system comprising:
a capacitive sensor array comprising at least one first sensor element, at least one second sensor element, and at least one third sensor element, wherein the at least one first sensor element and the at least one second sensor element are single and independent sensor element respectively, wherein the third sensor element comprises of a first portion and a second portion having sensing area equal to sensing area of the first portion, wherein a sensing area of the first sensor element, a sensing area of the second sensor element, and a sensing area of the third sensor element are equal to each other, wherein the sensing area of the first portion of the third sensor element is less than the sensing area of the first sensor element, and the sensing area of the second portion of the third sensor element is less than the sensing area of the first sensor element, wherein the first sensor element and the first portion of the third sensor element are permanently connected together, and the second sensor element and the second portion of the third sensor element are permanently connected together that is electronically isolated from the first conductive material, wherein the first and second portions of the third sensor element are electrically isolated;
a processing device configured to detect presence of a conductive object on the capacitive sensor array; and
a capacitance sensor coupled to the processing device and to the capacitive sensor array, wherein the capacitance sensor comprises:
a relaxation oscillator configured to receive input signals, from the first and second sensor elements, representing capacitances on the first, second, and third sensor elements, the relaxation oscillator further configured to generate an output signal, wherein the capacitances on the third sensor element is represented by simultaneously receiving the capacitances on the first and second sensor elements; and
a digital counter coupled to receive the output signal of the relaxation oscillator, the digital counter coupled to receive the output signal of the relaxation oscillator, the digital counter configured to measure at least one of a frequency and a period of the output signal of the relaxation oscillator.

13. The system of claim 12, further comprising a selection circuit that is coupled between the capacitive sensor array and the relaxation oscillator, wherein the selection circuit is configured to sequential select a sensor element from the multiple sensor elements to provide charge current to the selected sensor element or to receive an input signal representing capacitance of the selected sensor element.

14. The system of claim 13, wherein the capacitance sensor is configured to simultaneously scan the plurality of rows, and wherein the capacitance sensor is configured to simultaneously scan the plurality of columns.

15. A method comprising:
receiving, by a relaxation oscillator, input signals from a first sensor element and a second sensor element representing capacitances on a first sensor element, a second sensor element, and a third sensor element wherein the third sensor element comprises of a first portion and a second portion having sensing area equal to sensing area of the first portion, wherein a sensing area of the first sensor element, a sensing area of the second sensor element, and a sensing area of the third sensor element are equal to each other, wherein the sensing area of the first portion of the third sensor element is less than the sensing area of the first sensor element, and the sensing area of the second portion of the third sensor element is less than the sensing area of the first sensor element;
generating, by the relaxation oscillator, an output signal based on one or more of the received input signals;
applying the output signal of the relaxation oscillator to a digital counter; and
measuring, by the digital counter, at least one of a frequency and a period of the output signal of the relaxation oscillator;
detecting a presence of a conductive object on the third sensor element by simultaneously receiving the capacitances on the first and second sensor elements.

16. The method of claim 15, wherein the digital counter comprises a pulse width modulator (PWM) coupled to a timer, and wherein measuring the frequency of the output signal of the relaxation oscillator comprises:
enabling the timer by the PWM; and
reading an output of the timer during the gate time to obtain a number of counts, wherein the number of counts represents the frequency of the output signal of the relaxation oscillator.

17. The system of claim 15, wherein the digital counter comprises a pulse width modulator (PWM) coupled to a timer, and wherein measuring the period of the output signal of the relaxation oscillator comprises:
clocking the PWM by using the output signal of the relaxation oscillator;
enabling the timer by the PWM; and
reading an output of the timer when the PWM is interrupted to obtain a number of counts, wherein the number of counts represents the period of the output signal of the relaxation oscillator.

18. The system of claim 15, further comprising generating the input signals that represent the capacitances on the multiple sensor elements by sequentially scanning the multiple sensor elements.

19. The system of claim 15, further comprising generating the input signals that represent the capacitances on the multiple sensor elements by first simultaneously scanning the plurality of rows and then simultaneously scanning the plurality of columns.

20. The system of claim 15, further comprising generating baseline values for the multiple sensor elements, the baseline values representing no actuation of the multiple sensor elements.

* * * * *